United States Patent
Burdette et al.

(10) Patent No.: US 6,377,564 B1
(45) Date of Patent: Apr. 23, 2002

(54) METHOD FOR INCREASING UPLINK BANDWIDTH OVER A DEDICATED CONTROL CHANNEL

(75) Inventors: Brian Burdette; Keith William Anderson, both of Durham, NC (US)

(73) Assignee: Ericsson Inc., Research Triangle Park, NC (*) Notice: Subject to any disclaimer, the term of this patent is extended or adjusted under 35 U.S.C. 154(b) by 0 days.

(21) Appl. No.: 08/955,057

(22) Filed: Oct. 21, 1997

(51) Int. Cl.[7] .................................................. H04J 3/16
(52) U.S. Cl. ....................................................... 370/337
(58) Field of Search ................................ 370/337, 329, 370/345, 346, 347, 349, 442, 443, 444, 458, 459, 503; 455/524, 525, 516, 517, 560, 561; 340/825.5

(56) References Cited

U.S. PATENT DOCUMENTS

| | | | | |
|---|---|---|---|---|
| 5,404,355 A | * | 4/1995 | Raith | 370/336 |
| 5,506,837 A | * | 4/1996 | Sollner et al. | 370/296 |
| 5,550,992 A | * | 8/1996 | Hashimoto | 370/337 |
| 5,594,738 A | * | 1/1997 | Crisler et al. | 370/347 |
| 5,604,744 A | * | 2/1997 | Andersson et al. | 370/347 |
| 5,673,259 A | * | 9/1997 | Quick | 370/342 |
| 5,689,503 A | * | 11/1997 | Wada et al. | 370/337 |
| 5,729,542 A | * | 3/1998 | Dupond | 370/346 |
| 5,742,592 A | * | 4/1998 | Scholefield et al. | 370/329 |
| 5,768,276 A | * | 6/1998 | Diachina et al. | 370/432 |
| 5,878,033 A | * | 3/1999 | Mouly | 370/329 |
| 5,896,376 A | * | 4/1999 | Alperovich et al. | 370/348 |
| 5,921,745 A | * | 7/1999 | Threadgill et al. | 340/825.3 |

FOREIGN PATENT DOCUMENTS

| | | |
|---|---|---|
| EP | 0 720 310 A1 | 7/1996 |
| WO | WO 97/11566 | 3/1997 |
| WO | WO 97/20444 | 6/1997 |

* cited by examiner

Primary Examiner—Dang Ton
(74) Attorney, Agent, or Firm—Myers Bigel Sibley & Sajovec

(57) ABSTRACT

A method for increasing the bandwidth within an air interface between a mobile station and a base station is disclosed. The method involves the seizing of multiple random access channels on the dedicated control channel between a single mobile station and the base station. Individual messages are then transmitted over each of the seized random access channels on a frame-by-frame basis. Up to six channels may be seized and utilized at any particular time.

14 Claims, 4 Drawing Sheets

METHOD FOR INCREASING UPLINK BANDWIDTH OVER A DEDICATED CONTROL CHANNEL

BACKGROUND OF THE INVENTION

1. Technical Field of the Invention

The present invention relates to the air interface between a mobile station and a base station, and more particularly, to a method for increasing the uplink bandwidth from a mobile station to a base station over a dedicated control channel.

2. Description of Related Art

As the use of wireless communication services has increased over the past decade, the need for transmitting even more data over a wireless communications link has become necessary. This need has been further increased by the development of a variety of wireless communication services enabling a user to not only have voice communications over a communications link but also to transfer data. The major problem for voice and data transfers over the communications link is caused by bandwidth limitations. The available bandwidth limits the amount of information that can be transmitted over the air interface. Thus, any means for increasing the bandwidth provides a system with the ability to transfer more information and to provide more dynamic voice and data communication services.

There is currently ongoing work in the area of data transfers between mobile stations and base stations. The majority of the work in this area concentrates on increasing the bandwidth of the MS/BS link to enable the transfer of data over a shorter time period. One of the present solutions to this problem involves concatenating individual R-DATA messages in order to exceed the 255 byte limit which is presently imposed by layer 2 of the IS-136 protocol. Other schemes use various channel types in an attempt to increase transmission bandwidth. In some of the schemes, a mobile station will receive a page while camping on a digital control channel (DCCH). The mobile station then moves to a dedicated data channel (DDCH) to send or receive necessary data before returning to the DCCH. This is a reasonable solution when large amounts of data must be transferred. However, when smaller amounts of data must be transferred, for example, during e-mail or web browsing activities, it would be desirable to transfer the data without leaving the DCCH.

Presently, the base station provides a much greater bandwidth on the DCCH when transferring data to the mobile station than when it is receiving data from the mobile station. This is due to the fact that the base station may utilize every downlink frame when transferring data to a mobile station, but the mobile station may only use every sixth uplink frame to transfer data back to the base station. Thus, some method enabling a mobile station to remain upon the dedicated control channel, yet transfer data at a higher bandwidth, would be greatly desirable.

SUMMARY OF THE INVENTION

The present invention overcomes the foregoing and other problems with a method for transmitting messages over an air interface between a mobile station and base station having an increased bandwidth. The method initially involves the step of seizing multiple random access channels on a dedicated control channel existing between a mobile station and a base station. A single message may then be transmitted over each of the seized random access channels on a frame-by-frame basis.

The transmission procedure involves monitoring each of the seized random access channels for a shared channel feedback flag indicating that a message frame may be transmitted from the mobile station to the base station on the random access channel. The message frames are transmitted to the base station upon receipt of the indication. Transmissions on the different random access channels will each occur during different frame periods such that no two random access channel frame transmissions overlap each other. Upon transmission of a message frame on a random access channel, the channel is again monitored for the shared channel feedback flag for an indication that the transmitted message frame has been received by the base station. Each random access channel transmission of a message frame will occur approximately four frames after receipt of an indication that a random access channel is available for transmission, and the confirmation of receipt of the transmission frame by the base station is received approximately two frames after transmission of a message frame from the mobile station.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
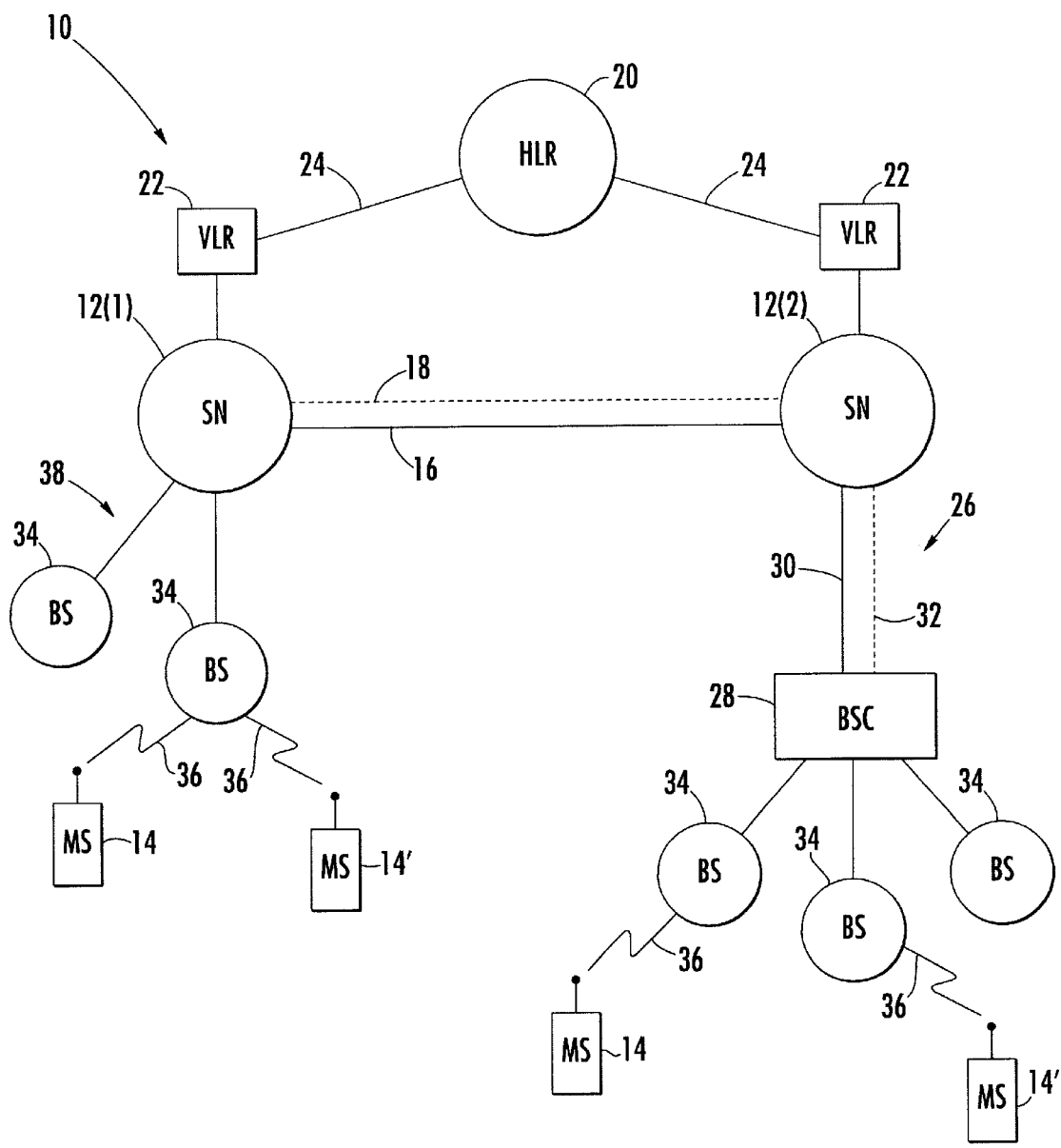
FIG. 1 is a schematic diagram of a cellular telephone network in which the present invention may be implemented.

Reference is now made to FIG. 1, wherein there is shown a schematic diagram of a wireless telephone network 10, providing wireless (cellular) telephone service within a given service area. The network 10 includes a plurality of interconnected switching nodes (SNS) 12 (also referred to as mobile switching centers—MSCs). Although only two switching nodes are shown, it will be understood that the network 10 likely includes many more interconnected nodes. The first and second switching nodes 12(1) and 12(2) may comprise any one of a number of known telecommunication switching devices, including those commonly used and known in the art for providing either digital or analog cellular service to a plurality of mobile stations (MS) 14. The switching nodes 12 are interconnected with each other for communicating via both voice trunks 18 (illustrated with broken lines) and signaling trunks 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up or tearing down voice and data communication links over the voice trunks 18 and controlling the provisions of calling services to the mobile station 14.

Each switching node 12 is also connected to a home location register (HLR) 20 through an associated visitor location register (VLR) 22 by means of a signaling link 24 providing a known mobile application part (MAP) or IS-41 type connection. The switching node 12 and visitor location register 22 may be co-located in a combined MSC/VLR. The home location register 20 stores information relating to the mobile station 14 and their subscriptions comprising location information and service profile information. This information is stored by the home location register 20 in association with the subscriber (directory) number (SNB) and mobile identification number (MIN) (or other protocol for identifying the mobile station) for the mobile station 14. A home location register 20 further supports a plurality of temporary subscriber (directory) numbers (TSNBs) which are assigned and allocated on an as need and temporary basis to be established (defined and connected) roaming mobile stations 14' (i.e., roamers).

In one cellular telephone network implementation illustrated generally at 26, the switching node 12 is further connected to at least one associated base station controller (BSC) 28 via both a signaling link 30 and a voice trunk 32. Only one base station controller 28 is shown connected to switching node 12(2) in order to simplify the illustration. The voice trunk 32 provides a voice and data communications path used to carry subscriber communications between the second switching node 12(2) and its base station controller 28. The signaling link 30 carries command signals between the node 12 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 14 over an air interface 36. The base station controller 28 functions to control this radio frequency communications operation.

In another cellular telephone network implementation, illustrated generally at step 38, the switching node 12(1) is further connected to a plurality of base stations (BS) 34, which operate to effectuate radio frequency communications with proximately located mobile stations 14 over the air interface 36. In this implementation, the functionality provided by the base station controller 28 (see, generally at step 26) is instead provided by the switching node 12.

Although direct communications links (signaling and/or trunk) between the nodes are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public-switched telephone network—PSTN). Illustration of the links in a "virtual" manner as shown in FIG. 1 is therefore by way of simplification of the drawing and the communications relationship between the various included nodes within the network 10.

Figure 2:
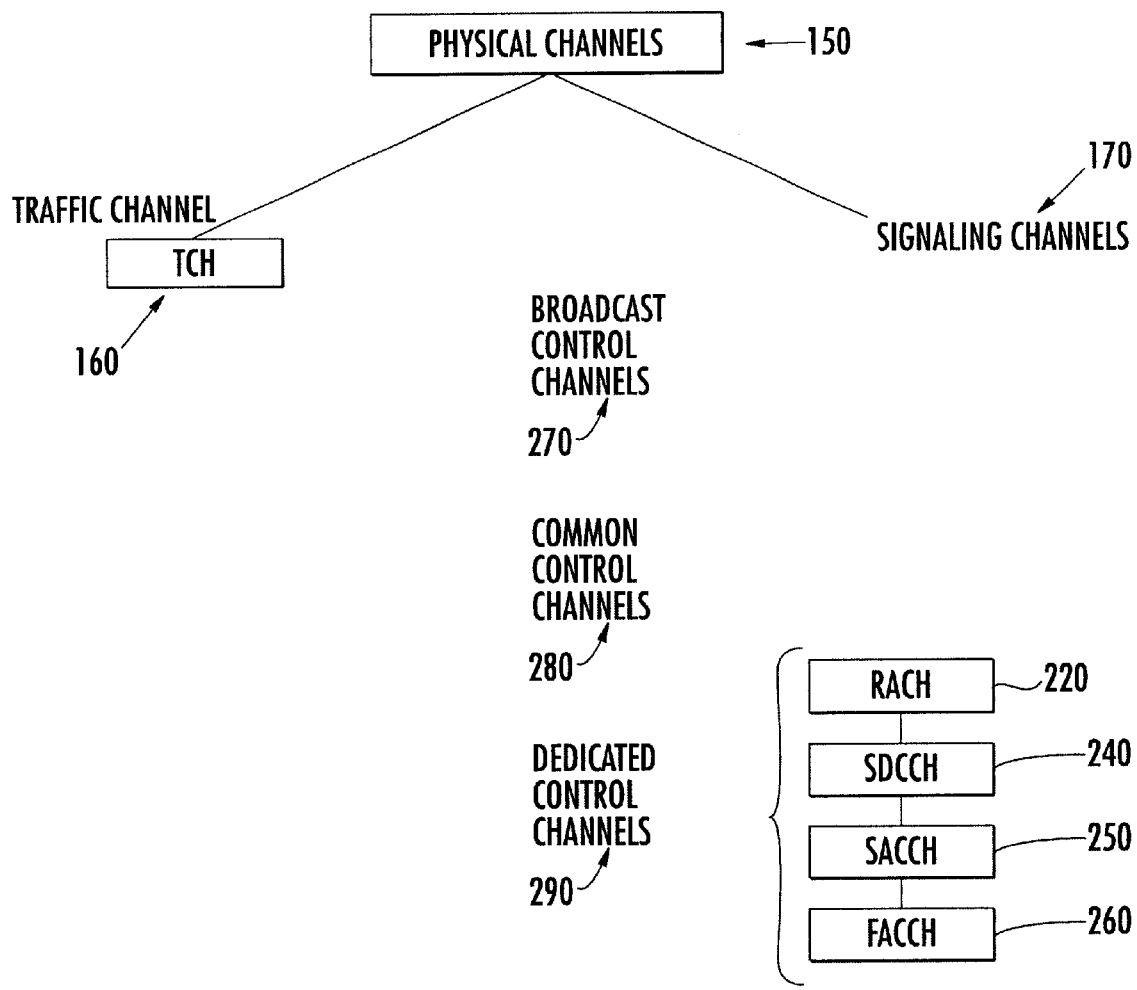
FIG. 2 is an illustration of the various logical channels on an air interface.

FIG. 2 illustrates the various logical channels of a mobile communications system. Broadcast control channels 270 are mainly utilized for communicating information from the serving BST to a particular mobile station traveling within its coverage area (down-link). Also included are common control channels 280 and dedicated control channels 290.

Dedicated control channels 290 include the Stand-alone Dedicated Control Channel (SDCCH) 240, Slow Associated Control Channel (SACCH) 250, the Fast Associated Control Channel (FACCH) 260 and the Random Access Channel (RACH) 220. The RACH 220 is used by the mobile station to request allocation of a Stand-alone Dedicated Control Channel (SDCCH) 240 to the BSC. The Stand-alone Dedicated Control Channel (SDCCH) 240 is used for signaling with a dedicated mobile station. Accordingly, the SDCCH 240 is the channel used for performing location update procedures whenever a mobile station 14 enters a new location area. The SDCCH is also utilized to initiate a call setup and to seize a traffic channel (TCH) 160. The Slow Associated Control Channel (SACCH) 250 is associated with a TCH 160 or an SDCCH 240. The SACCH 250 is a continuous data channel carrying continuous control information, such as measurement reports, timing advance and power order, between the serving BSC and the mobile station 14. Lastly, the Fast Associated Control Channel (FACCH) 260 is associated with a particular TCH to work in burst stealing mode to replace speech or data traffic with other necessary signaling.

Figure 3:
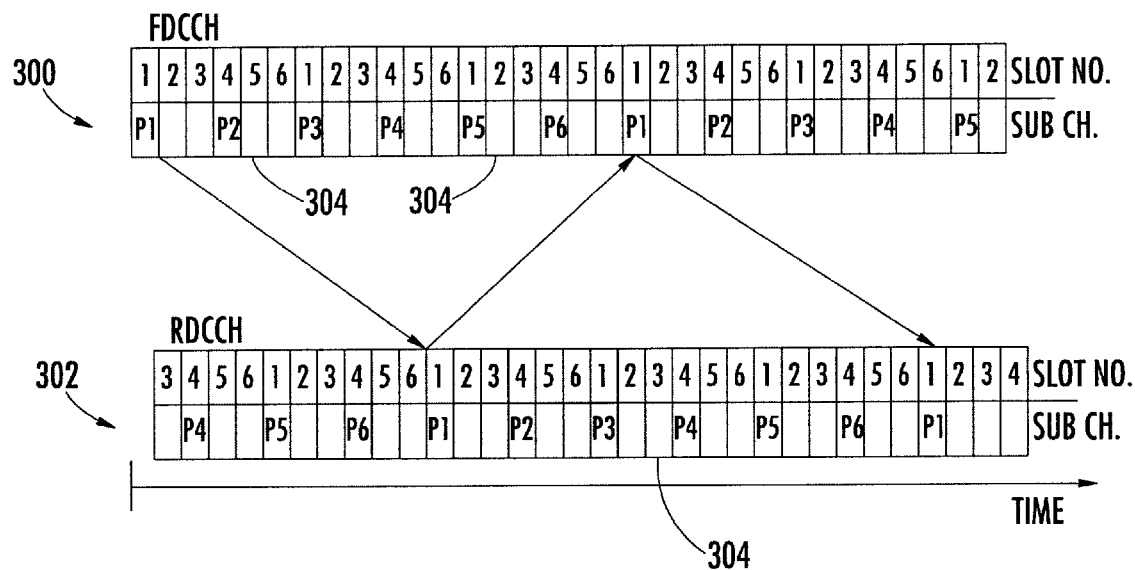
FIG. 3 is an illustration of the frame scheme for random access channels within a dedicated control channel.

Referring now to FIG. 3, there is illustrated the general configuration in which a random access channel (RACH) is configured within a dedicated control channel (DCCH). The dedicated control channel consists of the forward dedicated control channel (FDCCH) 300 and the reverse dedicated control channel (RDCCH) 302. The forward dedicated control channel (FDCCH) 300 transmits data from the base station 34 to the mobile station 14. The reverse dedicated control channel (RDCCH) 302 transmits data from the mobile station 14 to the base station 34. Both the FDCCH 300 and the RDCCH 302 are divided into a plurality of time slots 304 wherein each time slot represents a single frame. The time slots 304 are associated in groups of six frames. The RACH sub-channels are developed between the mobile station 14 and the base station 34 on the FDCCH 300 and the RDCCH 302 in the first and fourth time slots. Each mobile station 14 is capable of creating six separate RACH sub-channels 220 (P1–P6) on each DCCH 290.

Figure 4:
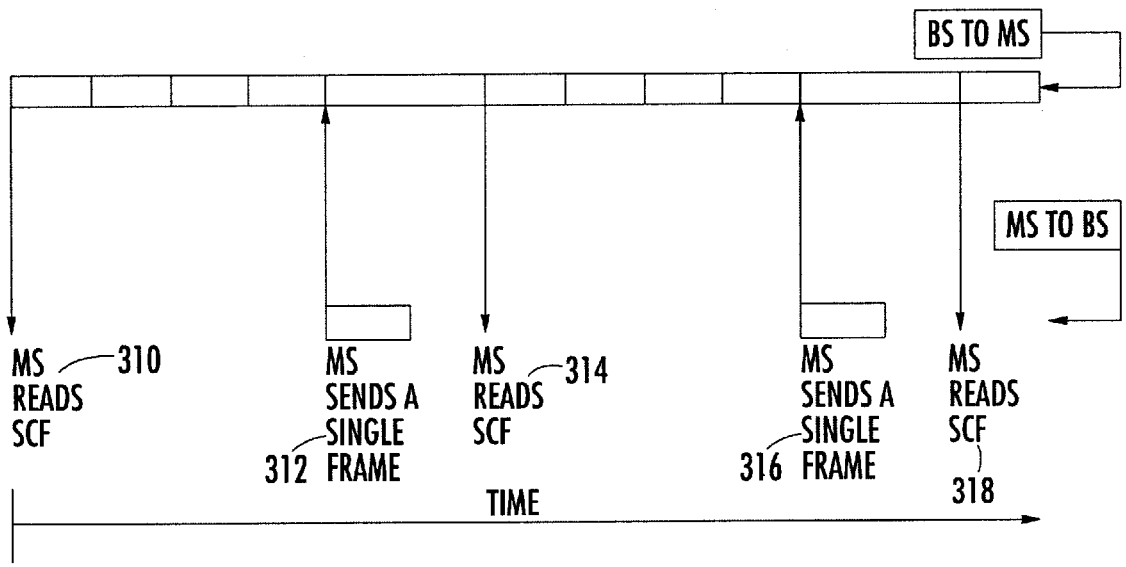
FIG. 4 is an illustration of how a single RACH transmits a message on a frame-by-frame basis.

Referring now also to FIG. 4, there is illustrated the manner in which an R-DATA message is transmitted over a RACH 220. When a mobile station 14 desires to transfer an R-DATA message to the base station 34, the mobile station 14 initially seizes a single RACH sub-channel 220 (i.e., P1). The mobile station 14 monitors the transmissions from the base station 34 on the RACH 220 for the shared channel feedback (SCF) flag at 310. The SCF flag is broadcast by the base station 34 and indicates to the mobile station 14 whether or not the seized RACH 220 is available for transmissions from the mobile station to the base station, and whether or not a previous frame transmission from the mobile station to the base station has been received.

If the mobile station 14 may transmit on the RACH 220, the mobile station breaks the R-DATA message down into individual message frames and transmits a single message frame of the R-DATA message to the base station 34 at 312. Two frames (40 milliseconds) later the mobile station 14 again monitors for the SCF flag at 314 to determine whether or not the transmitted message frame has been received by the base station. If so, four frames (80 milliseconds) later, the mobile station 14 transmits the next single message frame of the R-DATA message to the base station 34 at 316 and receipt by the base station is confirmed at 318. In this manner, the entire R-DATA message is transmitted from the mobile station 14 to the base station 34 on a frame-by-frame basis and confirmation of receipt of each frame by the base station is established.

Figure 5:
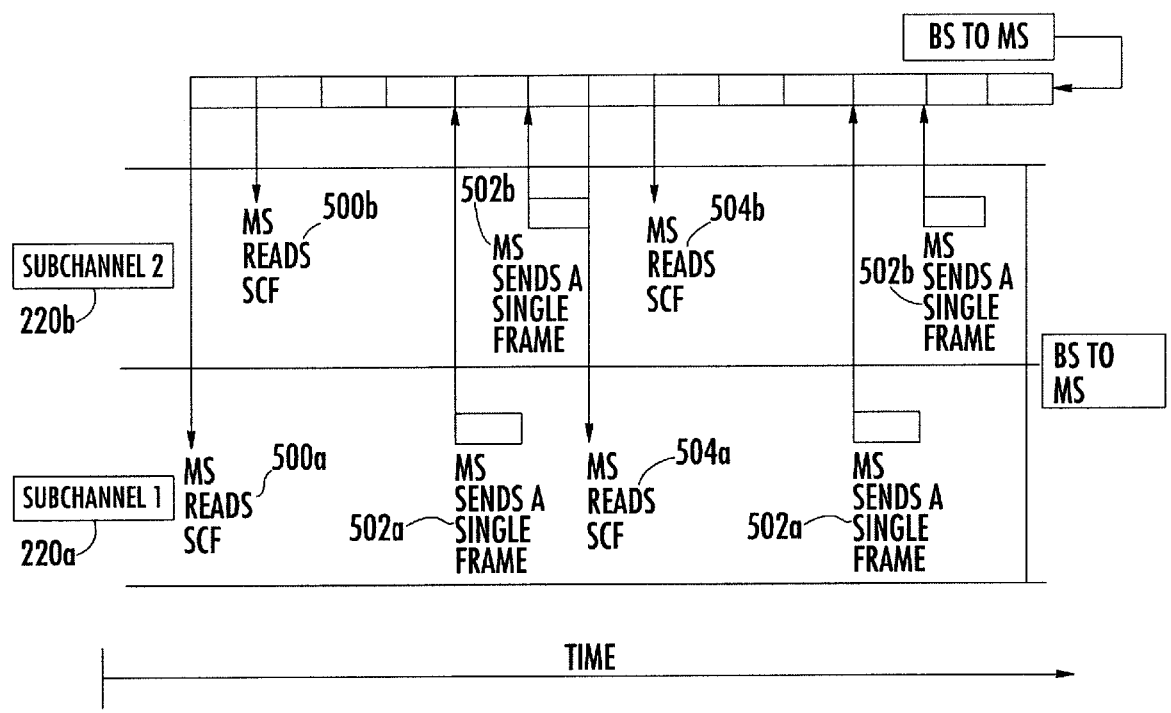
FIG. 5 is an illustration of the method of the present invention wherein a mobile station seizes a plurality of random access channels for message transmission.

Referring now to FIG. 5, there is illustrated the method of the present invention wherein multiple RACHS 220 are simultaneously seized to enable the transmission of multiple messages from the mobile station 14 on each RACH 220. This differs from prior applications wherein only a single RACH 220 may be seized by a mobile station 14. Each RACH 220 transports a separate message such that the base station 34 receives and decodes the messages on the plurality of RACH channels from a single mobile station 14 in the same manner as it presently receives and decodes a plurality of messages from a number of mobile stations. In this manner, the mobile station 14 may seize up to all six RACH sub-channels 220 for simultaneous transmission on the seized channels of up to six messages, and thus, increase the uplink bandwidth sixfold.

The mobile station 14 for the first sub-channel 220a initially reads the shared channel feedback (SCF) flag broadcast by the base station 34 at 500 to determine if the RACH 220a is available for transmissions. If the channel is available, the mobile station 14 transmits a single frame of a message four frames later to the base station at 502. After a two frame delay, the mobile station again reads the SCF flag at 504 to confirm receipt of the transmitted frame by the base station 34. The following frames of the message are transmitted in a similar manner.

The second RACH sub-channel 220b transmits in a similar manner but during time frame periods such that the mobile station 14 is neither reading the SCF flags (500b, 504b) or transmitting a single message frame (502b, 506b) during the same frame period as another seized and transmitting RACH channel. Thus, while the illustration of FIG. 5 demonstrates the MS 14 reading the SCF flags for both channels at time slots T1 and T2, respectively. Reading of the messages could occur at timeslots T1 and T3, T1 and T4, etc., as long as similar actions did not overlap with another channel. The mobile station 14 tracks the variables and timing constraints for each of the RACH sub-channels 220 to insure that transmission conflicts and overlaps do not occur.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for transmitting messages over an air interface between a mobile station and a base station, comprising the steps of:

seizing control of a plurality of random access channels between the mobile station and the base station; and simultaneously transmitting message frames from the mobile station to the base station on each of the plurality of random access channels.

2. The method of claim 1 wherein the step of simultaneously transmitting further comprises the steps of:

monitoring a seized random access channel for a first indication of an ability to transmit a message frame from the mobile station to the base station;

transmitting the message frame upon receipt of the first indication from the mobile station to the base station; and monitoring for a second indication of receipt of the message frame by the base station.

3. The method of claim 2 wherein the step of transmitting further comprises the step of transmitting the message frame a predetermined number of frames after receipt of the first indication.

4. The method of claim 2 wherein the step of monitoring for a second indication comprises monitoring for the second indication a predetermined number of frames after transmission of the message frame.

5. The method of claim 2 wherein the steps of monitoring comprise monitoring for a shared channel feedback flag on the random access channel.

6. The method of claim 1 wherein the step of transmitting further comprises the step of transmitting message frames during different frame periods for different random access channels.

7. A method for transmitting messages over an air interface between a mobile station and a base station, comprising the steps of:

seizing control of at least a first and a second random access channel between the mobile station and the base station;

monitoring on the first and second random access channels for a first indication of an ability to transmit a message frame from the mobile station to the base station;

transmitting to the base station, a first message frame of a first message upon receipt of the first indication on the first random access channel;

transmitting to the base station, a first message frame from a second message upon receipt of the first indication on the second random access channel, the first message frame from the second message transmitted in a frame slot different from the first message frame of the first message; and monitoring the first and the second random access channels for a second indication of receipt of the first message frames by the base station.

8. The method of claim 7 wherein the step of transmitting further comprises the step of transmitting the message frame a predetermined number of frames after receipt of the first indication.

9. The method of claim 7 wherein the step of monitoring for a second indication comprises monitoring for the second indication a predetermined number of frames after transmission of the message frame.

10. The method of claim 7 wherein the steps of monitoring comprise monitoring for a shared channel feedback flag on the random access channels.

11. A method for increasing the uplink bandwidth on a dedicated control channel between a mobile station and a base station, comprising the steps of:

seizing control of a plurality of random access channels on the dedicated control channel between the mobile station and the base station;

monitoring the seized random access channels for a shared channel control flag indicating the ability to transmit a message on the random access channels;

transmitting a message frame on a random access channel upon indication by the shared channel control flag of availability of the random access channel, wherein transmission of the message frame does not conflict with any other use of a time slot utilized by another of the seized random access channels; and monitoring the shared channel control flag for an indication of receipt of the transmitted message frame at the base station, wherein the step of monitoring for the indication comprises monitoring for the indication at least two frames after transmission of the message frame.

12. The method of claim 11 wherein the step of transmitting further comprises the step of transmitting the message frame four frames after receipt of the first indication.

13. The method of claim 11 further including the system of transmitting at least a second message frame in at least one other random access channel upon indication by the shared channel control flag of availability of the at least one other random access channel.

14. The method of claim 11 further including the step of tracking variables on the seized random access channels to avoid conflicting time slot transmissions in the seized random access channels.

* * * * *

UNITED STATES PATENT AND TRADEMARK OFFICE
CERTIFICATE OF CORRECTION

PATENT NO.    : 6,377,564 B1
DATED         : April 23, 2002
INVENTOR(S)   : Burdette et al.

It is certified that error appears in the above-identified patent and that said Letters Patent is hereby corrected as shown below:

<u>Title page,</u>
Item [56], References Cited, U.S. PATENT DOCUMENTS,
Entry for Threadgill et al., delete "5,921,745 A" and replace with -- 5,926,745 A --.

Signed and Sealed this

Twenty-sixth Day of November, 2002

Attest:

Attesting Officer

JAMES E. ROGAN
*Director of the United States Patent and Trademark Office*